United States Patent [19]
Chitrapu et al.

[11] Patent Number: 5,687,177
[45] Date of Patent: Nov. 11, 1997

[54] TONE BLOCKING USING VARIABLE DELAY BUFFER

[75] Inventors: Prabhakar Chitrapu, Princeton; Wei Lin, Parsippany, both of N.J.

[73] Assignee: Dialogic Corporation, Parsippany, N.J.

[21] Appl. No.: 729,048

[22] Filed: Oct. 10, 1996

Related U.S. Application Data

[63] Continuation of Ser. No. 511,060, Aug. 3, 1995, Pat. No. 5,604,793.

[51] Int. Cl.$^6$ ................................................. H04M 1/00
[52] U.S. Cl. ........................ 370/526; 370/260; 370/525; 379/88; 379/202; 379/283; 379/386
[58] Field of Search ................. 379/88, 201, 202, 379/89, 361, 283, 351, 386; 370/525, 526, 259, 260

[56] References Cited

U.S. PATENT DOCUMENTS

| | | | |
|---|---|---|---|
| 4,127,896 | 11/1978 | Cannon et al. | 370/526 |
| 4,227,248 | 10/1980 | Munter | 370/525 |
| 4,611,320 | 9/1986 | Southard | 370/241 |
| 4,625,081 | 11/1986 | Lotito | 379/88 |
| 4,689,760 | 8/1987 | Lee et al. | 370/526 |
| 4,908,825 | 3/1990 | Vea | 370/526 |
| 4,979,214 | 12/1990 | Hamilton | 379/386 |
| 5,267,305 | 11/1993 | Prohs et al. | 379/233 |
| 5,327,492 | 7/1994 | Parola | 379/361 |
| 5,434,913 | 7/1995 | Tung et al. | 379/202 |

*Primary Examiner*—Krista M. Zele
*Assistant Examiner*—Scott Wolinsky
*Attorney, Agent, or Firm*—Jeffrey I. Kaplan, Esq.

[57] ABSTRACT

A tone blocking system and method for use preferably in conferencing systems in order to prevent control tones from being transmitted to other conferees is disclosed. The buffer length used to process the signal and detect tones is varied, being increased when a tone is suspected to allow for sophisticated tone detection algorithms, and being decreased when silence is present by trimming the silence away. The technique minimizes delay, and its degrading effect on echo, but nonetheless provides for a lengthy buffer required to do reliable tone detection. The invention is applicable to any signal other than tone as well.

6 Claims, 4 Drawing Sheets

TONE BLOCKING USING VARIABLE DELAY BUFFER

This application is a continuation under Rule 1.60 of application Ser. No. 08/511,060, filed Aug. 3, 1995 which issued as U.S. Pat. No. 5,604,793 on Feb. 18, 1997.

TECHNICAL FIELD

This invention relates to telephony, and more specifically, to an improved technique for use in conferencing systems in order to prevent predetermined signal (e.g. tones) entered by conferees from being transmitted to other conferees.

BACKGROUND OF THE INVENTION

Conferencing systems have become popular in the telecommunications art over the past several years. Many such conferencing systems are used to implement conferences that involve entertainment types of services whereby a relatively large number of conferees may speak to one another for a fee which is set and advertised by the service provider. Common examples are dating services which are often advertised on television, whereby numerous conference conferees can telephone in and speak to one another. These conferences are implemented using a device known as a conference bridge, the purpose of which is to interconnect a plurality of conferees so that the audio signal transmitted to each conferee is effectively equal to the sum of all audio signals transmitted from the other conferees.

Other applications envisioned include remote stockholder meetings, distance learning, technical training, and any other scenario in which a plurality of conferees are interconnected.

During such conferences, the relatively large number of conferees varies as conferees enter and exit the conference call. The conference bridge includes appropriate control functions to allow conferees to enter and exit from the conference. These control functions of the conferencing bridge are typically invoked by the conferees entering Dual Tone Multi-Frequency (DTMF) tones in order to enter or exit various conferences, and to switch among the conferences. Unfortunately however, the entry of these tones is conveyed to the other conferees since a tone signal appears to the conference bridge just as any other audio signal. When the number of conferees is relatively large, this phenomena results in annoying tones being conveyed to the conferees on a relatively frequent basis. For example, on a commercial party line interconnecting thirty-two conferees, someone may enter or exit the conference every few minutes.

Additionally, DTMF tones can be used to control volume or any other function of the system. This fact further increases the frequency with which DTMF tones are generated by conferees.

While there exist some prior attempts at solving the above problem, these solutions give rise to other problems of their own. For example, U.S. Pat. No. 5,327,492 issued to Parola describes a system whereby a buffer is utilized to detect and block DTMF tones. However, in order for any detection algorithm to detect such tones, the buffer must have sufficient length, and therefore introduces a noticeable delay in the signal path. While the delay in and of itself is undesirable, the more noticeable problem is that the echoes normally present in such a system sound much worse to the conferees if the echo signal passes through a relatively long delay than they do if the delay is short. Thus, when a system designer seeks to minimize the effects of echo, delay should be minimized.

As is known to those skilled in the signal processing and telephony art, and as can be appreciated from the above, there are two competing interests in implementing prior art devices such as the Parola technique. First, in order to accurately detect the presence of DTMF tones, it is required that there be some signal history for processing. Hence, a buffer is introduced and the reliability of the tone detection increases with the length of the buffer. It would appear therefore, that a longer buffer is desirable. However, a countervailing interest is the minimization of the effect of echoes and the delay experienced by the signal. As the buffer length is increased, the delay and effect of the echoes increases, which results in degraded performance noticeable by all conferees.

In view of the above competing interests, a typical approach in the art is to try to trade off the two requirements so that the buffer length is both long enough to provide acceptable tone detection and tone blocking performance, while at the same time being short enough such that significant delay and the resulting negative impact upon the echo signal are avoided. It can be appreciated however, that perfect performance with respect to either of these competing requirements cannot be achieved.

SUMMARY OF THE INVENTION

The above and other problems of the prior art are overcome and a technical advance is achieved in accordance with the present invention which relates to a conferencing system which provides a variable length buffer. Specifically, a long buffer length is used if a DTMF tone is suspected, and the DTMF tone is confirmed using the long buffer length and the relatively reliable DTMF detection algorithm which requires this length. At times when the signal is determined to be voice or silence, a short buffer length is used. During silence times, the additional delay introduced by the long buffer used for DTMF detection is eliminated by stripping some of the silence typically found between speech segments so that the delay is shortened to its minimum.

In general, the invention comprises a technique to search for a known first signal which may be contained in a second signal. Buffer length is minimized until the presence of the first signal is suspected, at which time buffer length is increased to implement a relatively sophisticated algorithm to confirm the existence of the first signal. After the confirmation occurs, the buffer length is once again decreased.

DETAILED DESCRIPTION OF THE PREFERRED EMBODIMENT

For explanation purposes, we presume that the predetermined signal desired to be blocked is a tone. Of course, the invention is applicable to any signal desired to be blocked.

Figure 1:
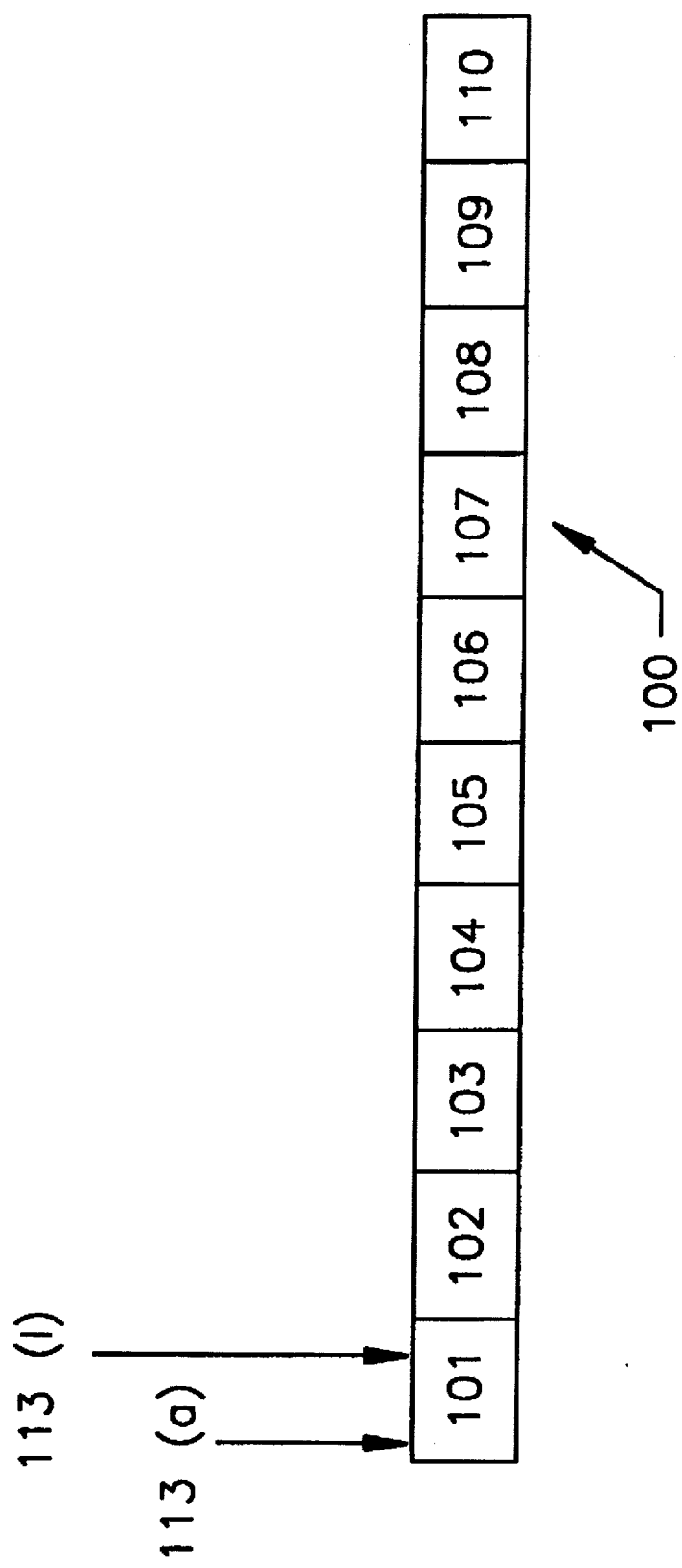
FIG. 1 is a conceptual diagram of a buffer having a maximum length of ten.

FIG. 1 depicts conceptually a buffer of maximum length 10, comprising audio storage blocks 101–110. Each audio storage block 101–110 is N samples in length. An exemplary value of N is 96, but N may be chosen in accordance with numerous design parameters which are not critical to the present invention. Actual storage requirements are XN, where X is the number of bits per sample. The audio stored in each storage block is termed herein an audio block. The specific parameters chosen such as sampling rate, block length, etc. are not critical to the present invention. Acceptable values for sampling rate and other such parameters are easily calculated by those of ordinary skill in this art. It is noted that the number of audioblocks required to detect tone depends upon the particular algorithm used and the degree of reliability required by the detection. Once these parameters are specified, the system designer can readily calculate the number of audio blocks required to confirm tone. For the exemplary system described herein, we presume that one block is sufficient to suspect tone but that it takes five (5) blocks to confirm tone (i.e.; to ascertain to within a specified certainty that tone is present).

The buffer is intended to be implemented between the conferee and the conference bridge. For purposes of the present explanation, we presume that a reliable tone detection algorithm desired to be used requires five consecutive audio blocks in order to accurately analyze the data and determine that it is a tone. Such analysis cannot be completed based upon one audio block because a single audio block which appears to be tone may actually be a portion of speech or other audio signal which is simulating a tone. Thus, when a single audio block appears to be tone, the event is termed "suspected tone". When five consecutive blocks are processed and determined to be suspected tone, the system concludes that a tone is present. While reliability of the tone detection algorithm increases with buffer length, the particular tone detection algorithm chosen, as well as the percentage reliability, which is required, will dictate the length of buffers 101–110. Each of these parameters are easily chosen by the systems engineer when configuring the conferencing system.

FIG. 1 also depicts two pointers, inpointer 112 and outpointer 113, respectively, pointed at storage 100. Inpointer 112 points to the audio storage block into which the next audio block from the conferee will be written, and outpointer 113 points to the audio storage block out of which the next audio block will be read and sent to the conference. The initial state of the system is such that audio blocks are both written into and read out of audio storage block 101. Thus, a delay of one is experienced whereby delay is measured as the number of storage blocks between inpointer 112 and outpointer 113, plus one.

We presume it takes five blocks of audio history in order to accurately detect a tone. The basic idea behind the invention is described as follows, and a flow chart with related discussion is presented thereafter in order to convey a better understanding of the invention.

Each time an audio block is received from a conferee, it is written into the location pointed to by inpointer 112. The audio block is checked by a signal analysis algorithm to determine whether it is speech, silence or suspected tone. A two bit indicator is reserved within each audio block, and the two bits are set to the appropriate one of three states to indicate, either (i) voice, (ii) suspected tone, or (iii) silence. We consider first, five consecutive blocks of suspected tone.

Since the first audio block is suspected tone, the audio block is saved in storage block 101 and tagged as suspected tone. Inpointer 112 is then moved to the right so that it points to location 102. The system continues to check each audio block input, and to write the audio block into a location to the immediate right of the previous block until it either confirms tone (i.e.; five consecutive blocks of suspected tone arrive), or confirms that no such tone exists. In the present example, five blocks of suspected tone will arrive and the tone will be confirmed. The audio block written into storage block 102 is also tagged as either speech silence or suspected tone (suspected tone for the present example), and inpointer 112 is then moved to the right still another location to storage block 103.

The system will continue in a similar manner. Since the first five audio blocks are presumed to be suspected tone, eventually storage blocks 101–105 will each include an audio block with its tag set to indicate suspected tone. At that point, the system will confirm the tone, and prevent it from being transmitted to other conferees by discarding the five audio blocks in question. The software then transfers control to the particular voice processing, conferencing, or other application to execute whatever action is dictated by the tone.

It should be noted that the actual length of the tone may be much longer than five audio blocks, but subsequent audio blocks arriving after tone confirmation are simply ignored. It is only after the application program executes the action dictated by the tone that control is returned to the software managing the buffer in FIG. 1. At that point, new audio blocks begin being received as previously described.

Concerning the transmission of audio blocks to the conference, the audio blocks are read out consecutively, one per read-out period, and transmitted to the conference bridge for conveyance to the other conferees. The read out period may be readily chosen by those of ordinary skill in this art, but in any event, should preferably be sufficient to deliver real-time speech.

Outpointer 113 begins at location 101. The tag of the storage block pointed to by outpointer 113 is checked to determine whether it is speech, silence or suspected tone prior to reading out such audio block and transmitting the same to the conference. If the audio block stored in the present location indicated by outpointer 113 is silence, then outpointer 113 does not read out the present block, but instead, outpointer 113 is moved to the right by one location. The information stored in the new location is then checked and, if silence, the process repeated. Outpointer 113 continues to move to the right until it either finds speech to read out, or, it reaches the same location as inpointer 112 in which case the delay is minimized. Thus, silence is trimmed to minimize delay.

If outpointer 113 is at a location which contains suspected tone, then such suspected tone should not be read out until it is confirmed that the suspected tone, is, in fact, voice and not tone. In such a case, a filler is read out instead and outpointer 113 remains at the storage block with suspected tone until the suspected tone is determined to be either tone or voice. If tone is confirmed, the five suspected tone audio blocks are discarded and the pointers reset as previously explained. If tone is not confirmed, it means that the suspected tone is actually part of a voice signal. Thus the suspected tone, which is really voice, is read out to the conference and the outpointer 113 is moved one to the right as previously described.

In general then, the system operates by starting in the position shown in FIG. 1, and moving inpointer 112 to the right each time an audio block is written into buffer 100. Each time an audio block is read out, it is checked to see if silence exists therein, at which point the silence is trimmed by moving outpointer to the right by one location and reading out the next rightmost block during the read out period. When outpointer 113 reaches the same audio block as the inpointer 112, the delay is once again minimized and the system then begins from its initial state.

Figure 2:
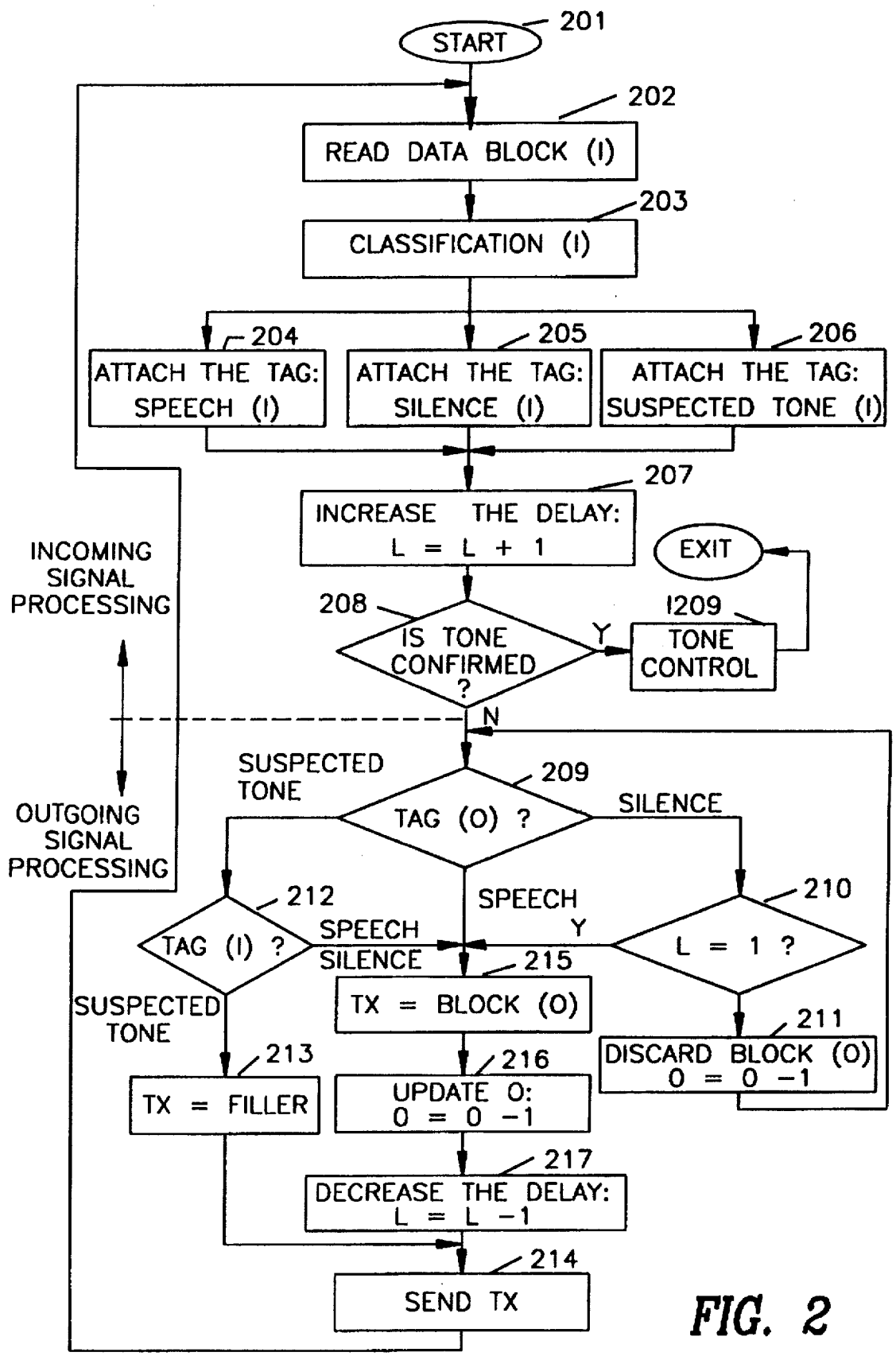
FIG. 2 is a flow chart which can be used to implement an exemplary embodiment of the present invention.

It is believed that the description of the flow chart shown in FIG. 2, as well as the example that follows that description, will help to clarify.

FIG. 2 shows a flow chart of the basic method utilized in order to implement the present invention previously described with respect to FIG. 1. The flow chart is entered at start block 201 and control is transferred to read audio block 202. At read audio block 202, the next incoming block is placed into storage block 101 of FIG. 1, since that is the initial position of inpointer 112 as shown in FIG. 1. Classification algorithm 203 may be any of a variety of well-known algorithms. While the processing contained within classification block 203 may be somewhat complex, there are a variety of well known techniques which can classify the incoming block into either speech, silence, or a suspected tone. It is noted that any one audio block can constitute only suspected tone, and not actual tone, since it is presumed herein that it requires at least five audio blocks to confirm the existence of the tone.

As indicated in FIG. 2, depending upon whether the audio block is classified as speech, silence or suspected tone, control is transferred to either operational block 204, 205, or 206, respectively, of FIG. 2.

Blocks 204, 205 and 206 set the tag to be either speech, silence or suspected tone, respectively. The tag can be implemented as two bits within the audio block, which bits are set by the software depending upon whether speech, silence or suspected tone is present. Thus, each audio block is received, classified as either speech, silence, or suspected tone, tagged appropriately, and placed into the storage block pointed to by inpointer 112.

After the tag is set, the delay is increased to L+1 at block 207, which is equivalent in FIG. 1 to moving inpointer 112 to the right by one storage block. Decision point 208 then checks to see if tone is confirmed. One simple way to do this is to have a counter incremented each time an incoming audio block is tagged with the suspected tone tag, and reset this counter each time silence or speech is detected. If the counter ever reaches 5, this constitutes a confirmation of tone. Should tone be confirmed, control is transferred to block 1209 which takes the appropriate action that is directed by the tone (e.g.; exit conference, change volume, etc.), and returns to start 201 for the next audio block.

It should also be noted when tone is confirmed, the inpointer 112 is reset by moving it to the left five positions. The outpointer 113 is moved to the left by one position. Thus, both inpointer and outpointer are moved to the audio block immediately prior to the arrival of the tone, thereby discarding the tone. Subsequently received audio blocks will over write the five stored blocks of suspected tone. In short, once tone is confirmed, the audio blocks that comprise the tone are blocked from transmission to the conference.

Returning to decision point 208, if tone is not confirmed, then the tag of the outgoing block is checked. Specifically, decision point 209 checks the tag of the audio block at the present position of outpointer 113. If the tag indicates silence, then the loop comprised of decision point 210 and operational block 211 continues to move outpointer 113 to the right until it "catches up" to inpointer 112. Each time loop 210-211 is executed, the one block of silence is discarded by moving outpointer 113 to the right by one.

It should be noted that the loop comprised of 209-211 should execute fast enough so that outpointer 113 trims all of the silence in an amount of time which is negligible compared to the amount of time comprising a read out period. In this manner, the trimming of the silence will be accomplished most efficiently.

If the tag on the audio block indicated by outpointer 113 is a suspected tone, then the tag of the inpointer is checked at 212 to determine if it is a suspected tone. If decision point 212 indicates a suspected tone, it means that there has been one or more suspected tones consecutively, but not enough consecutive suspected tones for a tone to be confirmed at decision point 208. Accordingly, should decision point 212 be reached by the flow chart of FIG. 2, it means that the system is in the process of determining whether a tone has been entered (e.g., there have been two or three suspected tones in a row). At this point, a filler is transmitted at block 213 which can either be silence or another copy of the last speech audio block transmitted. This gives the algorithm enough time to continue accepting audio blocks for tone detection while not transmitting those blocks in case they are in fact tone. The filler is a way of delaying transmission to the user until either (i) tone is confirmed and blocked, or (ii) tone is confirmed not to exist. The user will normally not notice the filler being transmitted.

After block 213, control is transferred back to read data block 202, for the next block to be written into buffer 100. It can be appreciated that the leftmost branch which invokes blocks 213 and 214 will serve to hold up the audio blocks from being transmitted when a tone is suspected, and will block that tone if confirmed, or transmit all of the suspected blocks if the tone is not confirmed, thereby indicating that the suspected tones were actually speech.

If decision point 212 determines that speech or silence is present in the present audio block being written, than that indicates that the one or more suspected tones were not actual tones. This fact can be appreciated by recalling that it takes five consecutive audio blocks of suspected tone to confirm tone. Thus, if decision point 212 indicates that the input audio block is speech or silence, a review of the flow of control will show that this implies that there is an output audio block of suspected tone and an input audio block of speech or silence, and that there is less than five consecutive blocks of suspected tone. Thus, the suspected tone was not actual tone. Accordingly, control moves to block 215 for transmission to the conference.

Returning to decision point 209, if speech is detected at the outpointer audio block, then block 215 and 216 serve to transmit the speech block and move outpointer 113 to the right by one storage block for examination of the next block. Block 217 then decreases the delay as shown therein, and control is once again transferred to block 214.

It can be appreciated from the above, that each time an audio block is suspected to be tone the system sends either silence or filler while it continues to save subsequent audio blocks until it confirms the tone by utilizing five consecutive blocks of suspected tone. Once the tone is confirmed, the entire system is reset. If, by the third or fourth block, it is determined that there is no tone, then the system transmits the audio block to the conference but proceeds to decrease the delay by discarding any silence blocks when they are available until the delay is decreased to one.

Figure 3:
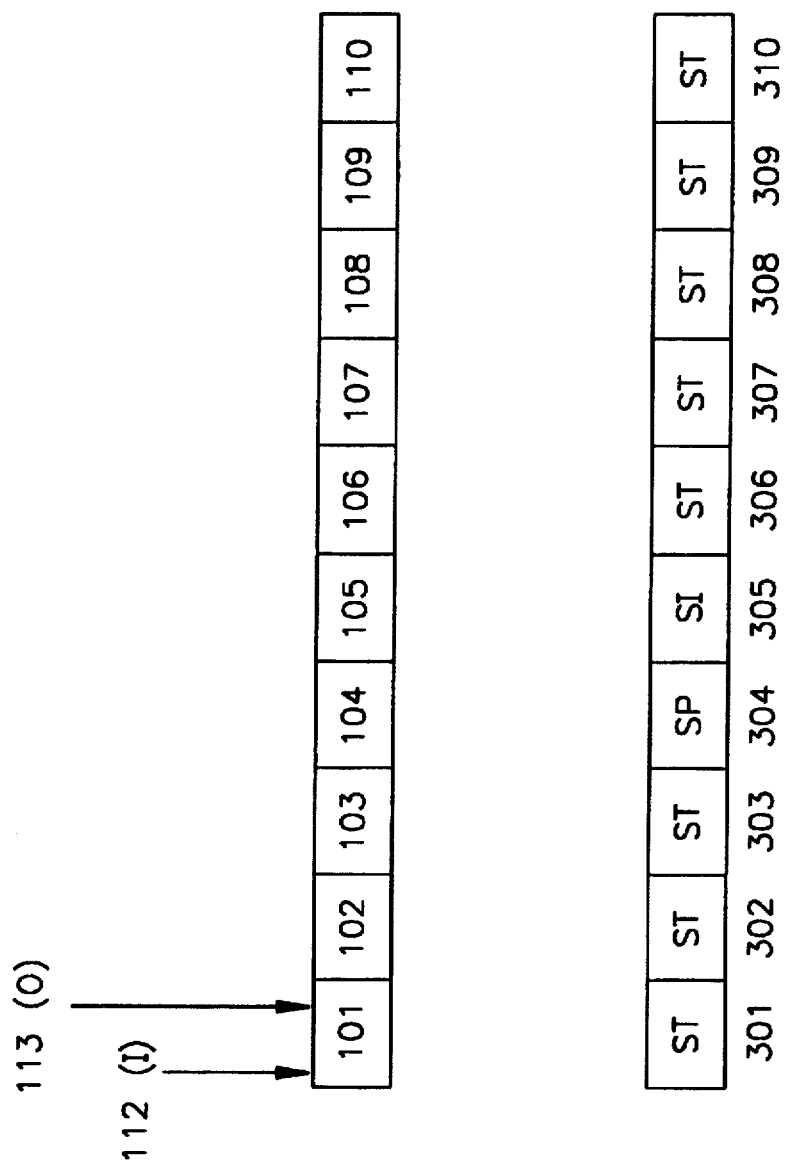
FIG. 3 depicts a plurality of storage blocks and several exemplary audio blocks to be processed.

FIG. 3 shows a stream of audio blocks 301–310. The exemplary stream of FIG. 3 includes three types of blocks suspected tone (ST), speech (SP) and silence (SI). Audio blocks 306–310 comprise five consecutive audio blocks of suspected tone, and therefore, under the assumptions herein, represent an actual tone. The following sequence of events would take place in accordance with the flow chart of FIG.

2 should an arriving stream of audio be comprised of audio blocks such as those shown in FIG. 3.

During the first cycle, audio block 301 is written into storage block 101. Since this audio block is indicated to be a suspected tone, outpointer 113 remains at storage block 101 and a filler block, perhaps silence, is read out to the conference. Additionally, inpointer 112 is now moved to storage block 102. Next, suspected tone 302 is written into storage block 102, the process repeated, and suspected tone 303 written into storage block 103.

At this point, in accordance with the flow chart of FIG. 2 inpointer 112 is positioned at storage block 103, outpointer 113 remains at storage block 101, and three blocks of filler have been transmitted to the conference. The next audio block received is 304 which is analyzed by the signal processing software and classified as speech. This block is written into storage block 104. Since a speech block has been detected, it is determined that audio blocks 301–303 were not tones, but rather, were only speech simulating a tone. Accordingly, the audio blocks 301–303 which were previously stored in storage blocks 101–103 in order to determine if a tone is confirmed, must now be transmitted to the conference. Accordingly, suspected tone 301 is read out of storage block 101, and outpointer 113 is moved to the right by one block to storage block 102.

Figure 4:
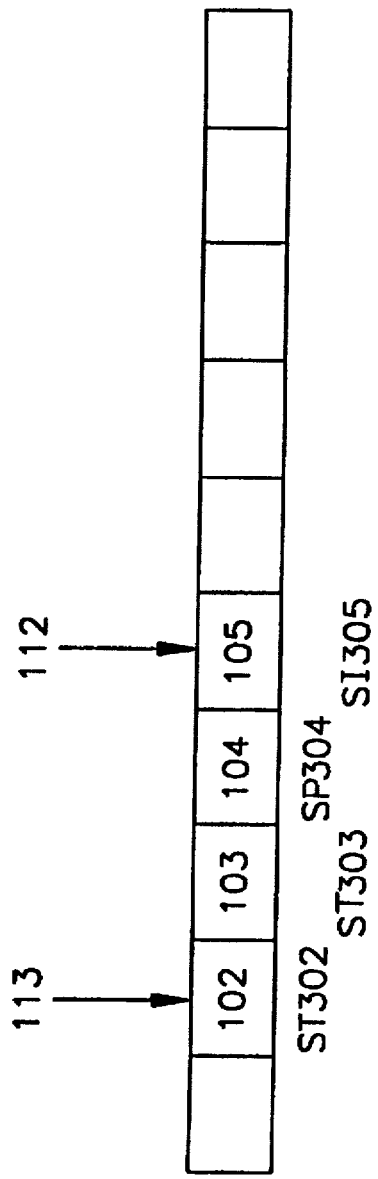
FIG. 4 shows the state of the storage blocks as a plurality of audio blocks are read in for processing.

During the next cycle through the software, inpointer 112 is moved one block to the right and silence block 305 is written into storage block 105. The system is then in the state indicated by FIG. 4.

Figure 5:
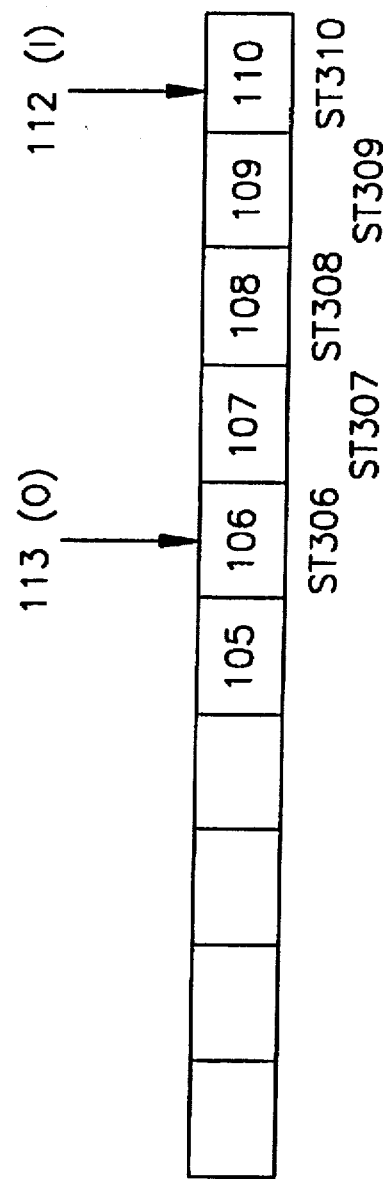
FIG. 5 shows a different state of the system.

During the next cycle, suspected tone 306 is written into storage block 106, suspected tone 302 is read out from storage block 102 and transmitted to the conference, and outpointer 113 is moved to the right by one block to point to storage block 103. This process continues in accordance with the flowchart of FIG. 2 for four more loops until the state of the system is as shown in FIG. 5. At that point, tone is confirmed since there are five consecutive suspected tones stored in storage block 106–110. As previously explained, at the point when the tone is confirmed, outpointer and inpointer 113 and 112 respectively are both reset to storage block 105 so that the tone is discarded in that the next audio blocks written in will overwrite storage blocks 106–110, and the tone will never be transmitted.

It is noted that the buffer, which includes ten storage blocks, may be circular so that the pointers return to the beginning thereof as they move.

It should also be noted that the technique has applicability in systems other than audio, such as video, or mixed audio and video, etc. Additionally, the technique may be employed to implement conferences over networks other than the telephone system, such as a Local Area Network (LAN).

It can be appreciated that while the above describes the preferred embodiment of the invention, other variations and/or additions will be apparent to those of ordinary skill in the art.

The invention claimed is:

1. A method of detecting the presence or absence of a first signal which my be contained in an incoming data stream, the method comprising the steps of:

storing the incoming data stream in a buffer;

determining whether the presence of said first signal is suspected; and if the presence of said first signal is suspected, increasing the length of the buffer and thereafter confirming the presence of said first signal by utilizing the buffer of increased length.

2. The method of claim 1 further comprising the step of dividing the incoming data stream into a plurality of blocks, and attaching a tag to each block, said tag being indicative of whether or not said first signal is suspected of being present.

3. A method of detecting the presence of a first signal which may be contained within a second signal in a communication system comprising the steps of:

storing the second signal in a buffer having a length;

processing the second signal to determine whether said first signal is suspected of being present therein; and changing the length of the buffer in response to said step of processing if said first signal is suspected of being present therein.

4. The method of claim 3 further comprising the step of confirming that said first signal is present after said buffer is increased in length.

5. The method of claim 3 wherein said step of processing includes the step of:

dividing the second signal into a plurality of audio blocks; and associating a tag with each of the plurality of audio blocks, said tag being indicative of the type of signal contained within said audio block.

6. A method of detecting tones in a call conferencing system comprising the steps of:

setting an inpointer and an outpointer at predetermined storage blocks, the inpointer and outpointer having a predetermined number of storage blocks therebetween, the inpointer and outpointer defining a delay having a length; and increasing the length of the delay each time an audio block in which there is suspected to be a tone is written into one of said storage blocks.

\* \* \* \* \*